United States Patent
Fisher et al.

(10) Patent No.: US 6,535,891 B1
(45) Date of Patent: Mar. 18, 2003

(54) METHOD AND APPARATUS FOR INDENTIFYING ACCESSES TO A REPOSITORY OF LOGICAL OBJECTS STORED ON A STORAGE SYSTEM BASED UPON INFORMATION IDENTIFYING ACCESSES TO PHYSICAL STORAGE LOCATIONS

(75) Inventors: Michel Fisher, Natick, MA (US); Steven M. Blumenau, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 274 days.

(21) Appl. No.: 09/670,137

(22) Filed: Sep. 26, 2000

(51) Int. Cl.[7] ............................................... G06F 17/30
(52) U.S. Cl. ....................................... 707/203; 707/204
(58) Field of Search ................................ 707/202, 203; 710/109; 711/4

(56) References Cited

U.S. PATENT DOCUMENTS

| | | | | |
|---|---|---|---|---|
| 5,619,696 A | * | 4/1997 | Nakagawa | 709/100 |
| 5,923,864 A | * | 7/1999 | Inoue | 711/205 |
| 6,105,103 A | * | 8/2000 | Courtright, II et al. | 711/1 |

OTHER PUBLICATIONS

Chang–Soo Kim; Gyoung–Bae Kim; Bum–Joo Shin volume management in SAN environment Parallel and Distributed Systems, 2001. ICPADS 2001. Conference on , 2001; pp.: 500–505.*

* cited by examiner

Primary Examiner—Diane D. Mizrahi
(74) Attorney, Agent, or Firm—Wolf, Greenfield & Sacks, P.C.

(57) ABSTRACT

One aspect is directed to a computer system including a host computer having an application space and defining a repository of logical objects visible thereto, and a storage system that a defines a physical space wherein data representing the repository is stored. The repository is mapped from application space to physical space to create mapping information identifying which units of storage in physical space store the repository, and the mapping information is made visible to the application space. Another aspect is directed to executing an incremental operation on a repository of logical objects. A further aspect is directed to a storage system that identifies to the host accesses to a repository of logical objects based upon accesses to corresponding units of storage in physical space. A further aspect is directed to determining that a subset of the logical objects in a repository satisfy a particular selection criterion, and transferring the subset over a network from a first to a second storage system.

80 Claims, 4 Drawing Sheets

| Physical Storage | File System Blocks | File Names |
|---|---|---|
| $LV_1T_0$ | 00-04 | File A |
| $LV_1T_1$ | 05-09 | File A |
| $LV_1T_2$ | 10-14 | File A |
| $LV_1T_3$ | 15-19 | File A |
| $LV_1T_4$ | 20-24 | File A |
| $LV_1T_5$ | 25-29 | File B; File C |
| $LV_1T_6$ | 30-34 | File C |
| $LV_1T_7$ | 35-39 | File C |
| $LV_1T_8$ | 40-44 | File B and File C |
| $LV_1T_9$ | 45-59 | File B |
| $LV_5T_0$ | 50-54 | File B |
| $LV_5T_1$ | 55-59 | File B |
| $LV_5T_2$ | 60-64 | File B |
| $LV_5T_3$ | 65-69 | File B |
| $LV_5T_4$ | 70-74 | File B |
| $LV_5T_5$ | 75-79 | File A and File B |
| $LV_5T_6$ | 80-84 | File A |
| $LV_5T_7$ | 85-89 | File A |
| $LV_5T_8$ | 90-94 | File A and File B |
| $LV_5T_9$ | 95-99 | File B |

METHOD AND APPARATUS FOR INDENTIFYING ACCESSES TO A REPOSITORY OF LOGICAL OBJECTS STORED ON A STORAGE SYSTEM BASED UPON INFORMATION IDENTIFYING ACCESSES TO PHYSICAL STORAGE LOCATIONS

FIELD OF THE INVENTION

The present invention is directed to a method and apparatus for identifying accesses to a repository of logical objects (e.g., a file system or database) stored on a data storage system by examining information relating to accesses to physical storage locations in the data storage system.

DESCRIPTION OF THE RELATED ART

Computer systems typically include one or more processing devices, as well as one or more data storage devices. FIG. 1 is a block diagram of a typical computer system 100, which includes a host computer 110, having a processor 120 and a memory 130, and a storage system 140. The storage system 140 can include any of a number of different types of storage devices (e.g., tape storage devices, floppy diskette storage devices, disk drive storage devices, etc.), or a combination of a number of different types of storage devices.

Application programs for the host computer 110 typically execute on the processor 120 and operate on logical objects (e.g., files, etc.) that are visible to the application programs, and that each includes one or more logically related blocks of data. The logically related blocks of data forming each logical object are physically stored in the storage system 140. Thus, as shown in FIG. 2, a typical computer system 100 can be viewed as having a number of hierarchical spaces or layers, including an application space 310, a physical space 330, and a mapping layer 320 disposed therebetween. As mentioned above, application programs executing on the host computer 110 operate on logical objects (e.g., files) in application space 310. The data forming the logical objects is stored on one or more storage devices 341–343 that are included in the storage system 140 and define the physical space 330. Thus, the data stored in the storage device 140 typically is organized in units of storage termed "physical blocks" that each includes a number of bytes of data (e.g., 512 bytes). Conversely, the logical objects operated upon in application space 310 are made up of "logical blocks". The mapping layer 320 typically is a data structure that maps the logical objects in application space 310 into physical space 330. Although the size of a logical block of data may correspond one-to-one to that of a physical block stored in physical space 330, this is not necessarily the case. Rather, one logical block of data can map to two or more physical blocks of data, or alternatively, multiple logical blocks of data can map to a single physical block of data in physical space 330.

The storage system 140 presents logical volumes of storage to the host computer 100. These logical volumes of storage can each correspond to one of the physical storage devices 341–343 included within the storage system 140. However, when the storage system 140 is an intelligent storage system, it may include a layer of mapping, within the physical space 330, between the logical volumes presented to the host computer 100 and the actual physical storage devices 341–343. Thus, there need not be a one-to-one correspondence between the logical volumes presented to the host computer 110 and the physical storage devices, as a single logical volume can be spread across multiple physical storage devices, or alternatively, a number of physical storage devices can be combined to store the data for a single logical volume.

The mapping layer 320 maps each logical object specified in application space 310 to one or more unique locations (e.g., physical blocks) in physical space 330 where the data forming the logical object is stored. The mapping layer 320 can include a single layer of mapping, such as a file system 322 or a Logical Volume Manager (LVM) 324, or as shown in FIG. 2, can include multiple mapping layers 322 and 324. LVMs typically are used in larger computer systems having a number of storage devices, and enable volumes of data storage to be managed at a logical (rather than physical) level. The presence or absence of the LVM 324 is transparent to both the application space 310 and the file system 322. In this respect, the file system simply maps from the application space 310 to what the file system perceives to be the physical space 330. If another layer of mapping, such as an LVM, is included in the mapping layer 320, it simply means that the result of the mapping done in the file system does not indicate the final mapping to the physical space 330.

In a typical computer system, the storage system 140 has no understanding of the logical relationship between the blocks of data that it stores in physical space 330. This is true because the logical grouping of data is done in the application and mapping spaces 310, 320, and is not passed to the storage system 140. Similarly, in a typical computer system, an application program executing in application space 310 has no understanding of where the data that forms a particular logical object is stored in physical space 330.

In many computer systems, sets of logical objects (e.g, files) are organized at a higher logical level, such that the computer system includes one or more repositories of logical objects. Examples of such repositories include a file system and a database, although other repositories of logical objects are also possible. Such repositories are to be distinguished from a single logical object, which may be made up of multiple logical blocks of storage, but which comprises only a single logical object that is visible to application programs executing in application space.

SUMMARY OF THE INVENTION

One illustrative embodiment of the invention is directed to a method for use in a computer system, the computer system including a host computer having an application space and defining a repository of logical objects visible to the application space, the computer system further including a storage system that a defines a physical space wherein data representing the repository of logical objects is stored, the repository of logical objects including a plurality of logical objects. The method comprises acts of: (A) mapping the repository of logical objects from the application space to the physical space to create mapping information identifying which units of storage in the physical space store the repository of logical objects; and (B) making the mapping information visible to the application space.

A further illustrative embodiment of the invention is directed to a computer readable medium encoded with a program for execution on a computer system including a host computer and a storage system, the host computer having an application space and defining a repository of logical objects visible to the application space, the storage system defining a physical space wherein data representing the repository of logical objects is stored, the repository of logical objects including a plurality of logical objects. The program, when executed on the computer system, performs a method comprising acts of: (A) mapping the repository of logical objects from the application space to the physical space to create mapping information identifying which units of storage in the physical space store the repository of logical objects; and (B) making the mapping information visible to the application space.

Another illustrative embodiment of the invention is directed to a method for use in a computer system, the computer system including a host computer and a storage system, the host computer having an application space and defining a repository of logical objects visible to the application space, the repository of logical objects including a plurality of logical objects. The method comprises acts of: (A) executing an operation on the repository of logical objects; and (B) subsequent to the act (A), executing an incremental operation on the repository of logical objects, such that the incremental operation is performed only on those of the plurality of logical objects that have changed subsequent to the execution of the operation in the act (A).

A further illustrative embodiment of the invention is directed to a computer readable medium encoded with a program for execution on a computer systems including a host computer and a storage system, the host computer having an application space and defining a repository of logical objects visible to the application space, the repository of logical objects including a plurality of logical objects. The program, when executed on the computer system, performs a method comprising acts of: (A) executing an operation on the repository of logical objects; and (B) subsequent to the act (A), executing an incremental operation on the repository of logical objects, such that the incremental operation is performed only on those of the plurality of logical objects that have changed subsequent to the execution of the operation in the act (A).

Another illustrative embodiment of the invention is directed to an apparatus for use in a computer system including a host computer and a storage system, the host computer having an application space and defining a repository of logical objects visible to the application space, the storage system defining a physical space wherein data representing the repository of logical objects is stored, the repository of logical objects including a plurality of logical objects. The apparatus comprises at least one controller, coupled to the host computer and the storage system, that maps the repository of logical objects from the application space to the physical space to create mapping information identifying which units of storage in the physical space store the repository of logical objects, the at least one controller making the mapping information visible to the application space on the host computer.

A further illustrative embodiment of the invention is directed to a storage system for use in a computer system including the storage system and a host computer, the host computer having an application space and defining a repository of logical objects visible to the application space, the repository of logical objects including a plurality of logical objects. The storage system comprises at least one storage device that defines a physical space wherein data representing the repository of logical objects is stored, the at least one storage device further storing access information identifying accesses to units of storage in the physical space. The storage system further comprises at least one controller that identifies to the host computer accesses to the repository of logical objects based upon the access information identifying accesses to the corresponding units of storage in physical space that store the repository of logical objects.

Another illustrative embodiment of the invention is directed to a method for use in a computer system, the computer system including a host computer having an application space and defining a repository of logical objects visible to the application space, the repository of logical objects including a plurality of logical objects, the computer system further including a first storage system and a second storage system each coupled to the host computer via a network, the repository of logical objects being stored on the first storage system. The method comprises acts of: (A) determining that a subset of the plurality of logical objects in the repository satisfy a particular selection criterion; and (B) transferring the subset of the plurality of logical objects, but not the entire repository of logical objects, over the network from the first storage system to the second storage.

DETAILED DESCRIPTION OF THE INVENTION

In accordance with one illustrative embodiment of the present invention, a method and apparatus is provided for identifying accesses to a repository of logical objects based upon accesses to the physical blocks that store, in physical space, the data forming the repository of logical objects. The term "repository of logical objects" is used herein generically to refer to any set of logical objects (e.g., a file system, a database (which for the purposes of this application can be considered to be a type of file system), or other group of related logical objects) and is not intended to be limited to any particular type of repository of logical objects. By identifying accesses to a repository of logical objects at the physical level, various embodiments of the present invention provide significant improvements over prior art techniques for processing repositories of logical objects, as discussed below.

One application with which the techniques of the present invention can be employed is to perform a virus scan on a file system. A virus scan is a program conventionally run on a file system to determine whether the file system contains any viruses. A conventional virus scan requires that each file within the file system be checked separately for viruses, and typically requires that the computer system 100 be placed off-line while the virus scan is performed. For large file systems, the virus scan can take a significant amount of time (e.g., 60–80 hours), which, for many types of computer system installations, is an unacceptable length of time for the system to be down.

Applicants have appreciated that once a file has been determined to be virus-free, it cannot become infected unless new data is written to the file. Therefore, once a complete virus scan is performed upon a file system, subsequent virus scans need only be performed on those files within the file system that have been updated subsequent to the previous scan that verified that the file system was virus-free. As a result, in one embodiment of the present invention, an incremental virus scan can be performed for a file system (or other repository of logical objects) such that only those files (or logical objects) that have changed subsequent to a previous iteration of the virus scan are checked. This can provide a significant performance improvement, in that a dramatic decrease in the number of files actually scanned can be achieved.

Figure 2:
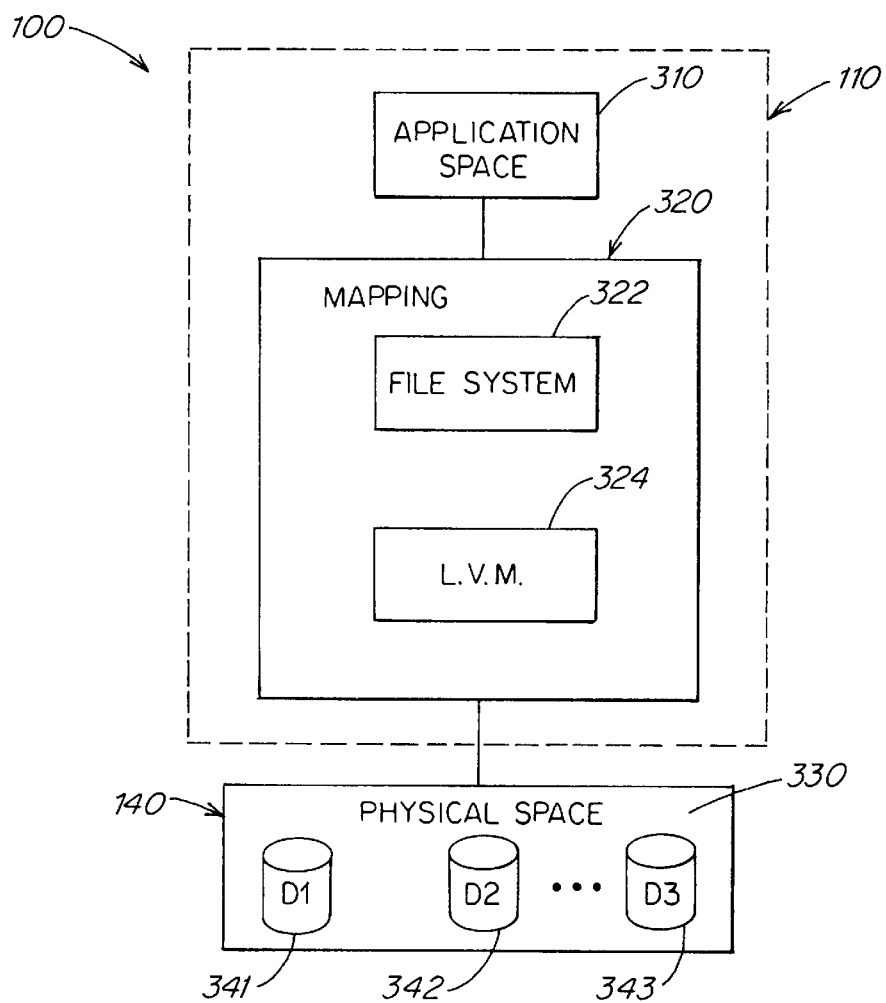
FIG. 2 is a functional block diagram of the computer system of FIG. 1, illustrating a mapping layer that performs a mapping of logical objects from application space to physical space.

Many data storage systems 140 include a feature that identifies information at the physical level (i.e., physical space 330 in FIG. 2) that has changed subsequent to a particular point in time. This information can be provided in any of numerous ways, and the present invention is not limited to use with storage systems that employ any particular technique. For example, storage systems from the SYMMETRIX line of storage systems available from EMC Corporation, Hopkinton, MA, include a set of bits, organized in physical space 330 (FIG. 2), which identifies portions of the storage system that include data that has changed subsequent to a particular reference time. The SYMMETRIX line of storage systems is described in numerous publications from EMC Corporation, including the SYMMETRIX model 55XX product manual, P-N200-810-550, rev. F, February, 1996.

Figure 1:
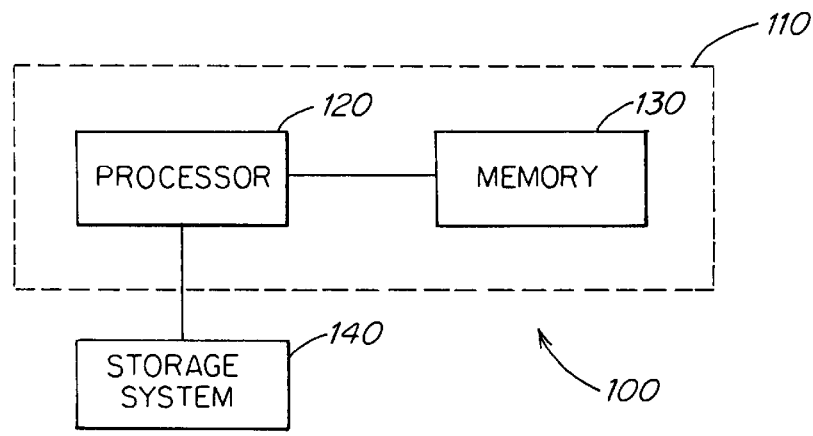
FIG. 1 is a functional block diagram of a computer system on which aspects of the present invention can employed.

In the SYMMETRIX line of storage systems, as well as other intelligent disk drive storage systems, data is stored in multiple disk drives in units called tracks. A typical track size is 32K bytes. An intelligent storage system typically includes configuration information (sometimes referred to as metadata) that is used in configuring the tracks of data in the storage system. In the SYMMETRIX line of storage systems, this metadata includes information relating to which tracks in the storage system have data included therein that has changed since a particular reference time. This information can take any of numerous forms. In one implementation, a bitmap is provided for each logical volume stored in the storage system. As discussed above, a logical volume represents a unit of storage that the storage system presents to the host computer, and that the host computer 110 (FIG. 1) perceives to correspond to a physical storage device (e.g., a disk drive) in the storage system 140. However, when additional mapping is performed within the storage system 140, there need not be a one-to-one correspondence between the logical volumes presented to the host computer 110 and the physical devices in the storage system 140. Nevertheless, for the purposes of the present application, the change information provided for each logical volume is considered to relate to the physical storage space 330 in the data storage system, because the logical volume level is the lowest level accessible to the host computer 110, and is perceived by the host to correspond to physical space.

In the above-discussed implementation, the bitmap for each logical volume includes a bit corresponding to each track in the logical volume, with the bit indicating whether the track includes data that has changed subsequent to the reference point in time. The change information maintained on the track level for each logical volume can include multiple copies that are independently resettable, so that different instances of monitoring using different reference times can be employed simultaneously. In addition, the bitmap for each logical volume is stored together as a single data structure. Thus, by examining the bitmap for each logical volume, a determination can be made as to which tracks on the storage system 140 include data that has changed subsequent to the particular reference time when the bitmap was last reset. In accordance with one illustrative embodiment of the present invention, such change information at the physical level is examined to identify the changes made to a repository of logical objects.

In the description of various embodiments of the present invention provided below, the change information at the physical level is described in connection with the above-discussed format relating to a bitmap for each logical volume indicating which tracks have changed subsequent to a reference point in time, which is one particular format of change information provided by a storage system from the SYMMETRIX line of storage systems. However, it should be appreciated that the present invention is not limited in this respect, and that the embodiments of the present invention described below can be used in connection with any suitable format for identifying accesses to data stored at the physical level.

To use change information in physical space 330 (FIG. 2) to determine changes to a repository of logical objects, one embodiment of the present invention is directed to a routine for determining the locations in physical space 330 that store the data forming the repository of logical objects, as well as the location of specific logical objects within the repository (e.g., files in a file system). File systems typically are organized as a root having a number of directories thereunder, with each directory including one or more files. Files in the file system are stored in physical storage space allocated to the file system. Thus, the file system can be considered as having a set of contiguous file system data blocks. This is illustrated conceptually in FIG. 3, wherein a file system 1000 is shown as comprising N file system blocks, extending contiguously from block 1006 (labeled block 0 through block 1022 (labeled block N-1). The file system assigns its file system blocks to store each of the files that the file system owns. Although the entire file system space includes a set of contiguous file system blocks, each file within the file system need not be stored in contiguous blocks, and may be spaced across discontiguous file system blocks.

In a typical computer system 100 (FIG. 2), the storage system 140 allocates the necessary amount of storage in physical space 330 to store the file system 1000. This storage space is allocated in terms of physical blocks of storage space organized in one or more logical volumes presented to the host computer 110. As discussed above, each logical volume is perceived by the host computer 110 as corresponding to a physical storage device, although within an intelligent storage system this mapping is not constrained to a one-to-one relationship, as a single logical volume can be stored across multiple physical storage devices, or multiple physical storage devices can be combined to define a single logical volume.

Figure 3:
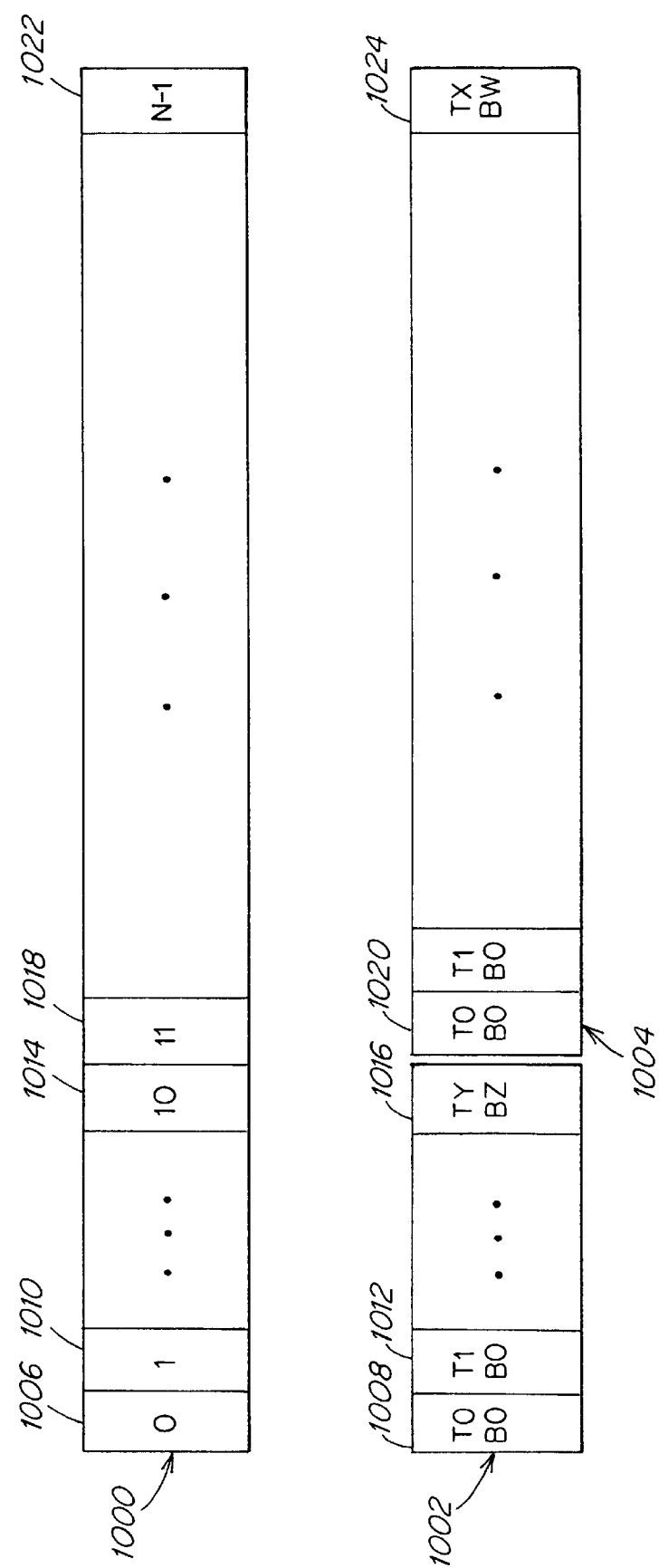
FIG. 3 conceptually illustrates the allocation of physical storage space to a file system.

Conventionally, logical volumes are organized as a set of tracks, each including a plurality of physical blocks of storage. Thus, when physical storage is allocated to a file system 1000, the allocated physical storage is comprised of entire logical volumes or portions thereof, with each allocated portion of a logical volume being subdivided according to tracks and blocks included therein. This is shown in FIG. 3, which illustrates the physical storage space allocated to file system 1000 as including logical volumes 1002 and 1004, with the allocated portion of logical volume 1002 extending from track zero, block zero (T0B0) to track Y, block Z (TYBZ), and the allocated portion of logical volume 1004 extending from track zero, block zero (T0B0) to track X, block W (TX,BW).

As mentioned above, in the SYMMETRIX line of storage systems, information about data that has changed subsequent to a reference point in time is provided on a track basis, in particular with a bitmap for each logical volume illustrating which tracks within the logical volume have data that has changed. Accordingly, in one embodiment of the present invention, a mapping is performed between a repository of logical objects (e.g., the file system 1000) and the physical storage space 330 (formed by the above-discussed portions of logical volumes 1002 and 1004), so that the change information stored on a track basis can be used to identify which logical objects with the repository of logical objects (e.g., which files within the file system 1000) have changed since the reference point in time. This can be done in any of numerous ways, as the present invention is not limited to any particular mapping technique.

In one embodiment of the present invention, the mapping is performed employing information provided from both the host computer 110 and the storage system 140. A file system typically includes, for each file, a listing of the file system blocks (i.e., the blocks 1006 through 1022 in FIG. 3) in which each file is stored. In addition, Applicants have appreciated that the storage system 140 typically includes information that defines the mapping between the file system blocks and the physical storage blocks on which that data is stored, as that mapping is created when one or more logical volumes are allocated to the file system. For example, in a non-striped storage system, the file system blocks are stored in order in the physical blocks assigned thereto.

Using the two pieces of information described above, one embodiment of the present invention determines the mapping from the file system blocks to the tracks and physical blocks on which they are physically stored. For example, assuming a simple case wherein the file system blocks and the physical storage blocks are identically sized, and wherein only a single physical block is stored on a track, a simple one-to-one mapping would occur from the file system blocks to the physical storage blocks. Referring to FIG. 3, and assuming that logical volume 1002 includes eleven tracks allocated to file system 1000, file system block 1006 would be stored on track zero, block zero (T0B0) 1008 in logical volume 1002, file system block 1010 would be stored on track 1012 (T1B0) in logical volume 1002, and file system block 1014 (i.e., block ten) would be stored on track 1016 (labeled TyBz in FIG. 3) in logical volume 1002. Correspondingly, file system block 1018 (i.e., block eleven) would be stored on track 1020 (T0B0) in logical volume 1004, and file system block 1022 (i.e., block N-1) would be stored on track 1024 (labeled TxBw) in logical volume 1004.

It should be appreciated that the above-simplifying assumptions generally will not apply, as a number of additional variables can impact the mapping between the file system blocks and the physical tracks and blocks corresponding thereto. For example, the file system block size can differ from the physical block size, and multiple physical blocks can be stored per track.

In one embodiment of the invention, these and other types of complexities are dealt with simply by converting the file system space and the physical space allocated thereto to a common unit size. For example, the file system space and the physical space allocated thereto each can be converted to bytes. Thus, the number of file system blocks can be multiplied by the number of bytes in a file system block to determine the number of contiguous bytes in the file system space. The numerical identifier for each file system block also can be multiplied by the number of bytes in a file system block to generate a byte identifier for the first byte of each file system block in the file system space. Similarly, the physical storage space also can be converted to a number of contiguous bytes, so that the mapping from the file system space to the physical storage space can be matched up byte-by-byte.

While the conversion can be accomplished to the byte or even bit level, in one embodiment of the present invention the mapping from the file system space to the physical storage space is done at the track level, as this is the lowest level at which the storage system provides change information. Thus, the mapping is not done at a lower level of granularity to simplify computation. However, it should be appreciated that the present invention is not limited in this respect, and that if the storage system supports change or access information at a granularity different than the track level (e.g., the byte level), the mapping can be done to a different level.

Figures 4, 5:
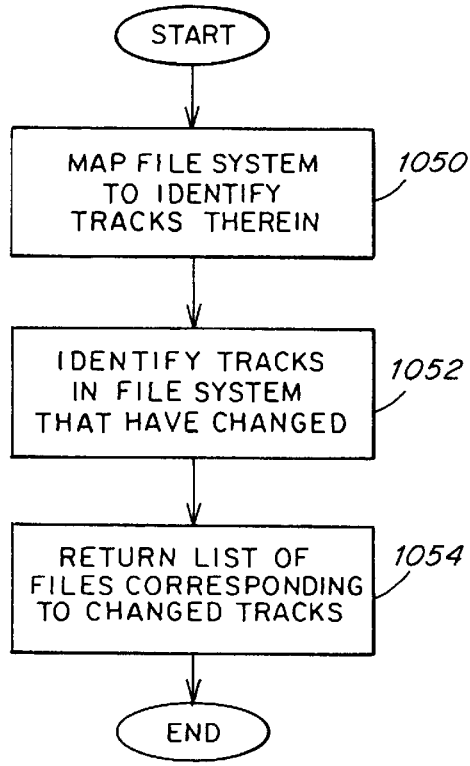
FIG. 4 illustrates a mapping table that can be developed according to one illustrative embodiment of the invention to determine the correlation between files in a file system and the physical storage locations that store their corresponding data.
FIG. 5 is a flow chart of a routine, according to one illustrative embodiment of the invention, for determining a list of files within a file system that have data that has changed subsequent to a reference time.

When the mapping is done to the track level, the total number of bytes in the file system space can be divided by the number of bytes in a physical block size, and then that number can be further divided by the number of physical blocks in a track, to determine the number of tracks used to store the file system. The number of file system blocks assigned to each track is determined by multiplying the number of physical blocks per track by the physical block size, and then dividing by the file system block size. A simple example illustrates the point referring to FIG. 4. In this example, the file system 1000 includes one hundred blocks (i.e., N equals one hundred in FIG. 3), each including sixteen bytes of data. Conversely, the physical blocks of data include only eight bytes, and each track includes ten physical blocks. In this example, twenty (i.e., one hundred times sixteen, divided by eight and then divided by ten) tracks of physical storage space are employed to store the file system 1000. In the example shown in FIG. 4, these tracks are spread evenly across two logical volumes, denoted in FIG. 4 as $LV_1$ and $LV_5$. FIG. 4 illustrates how the mapping from the file system space to the physical storage space can be performed, assuming that logical volumes $LV_1$ and $LV_5$ each includes ten tracks labeled $T_0$–$T_9$. The blocks of the file system simply are assigned to the physical storage space in a contiguous fashion, with five (i.e., ten physical blocks per track times eight bytes per physical block, then divided by sixteen bytes per file system block) file system blocks being assigned to each physical track.

Using the simple mapping routine described above, the overlying of the file system storage space onto the allocated physical storage space can be performed in a straightforward manner. Then, in one embodiment of the present invention, a second mapping iteration is performed to correlate which files within the file system are stored in the various physical storage locations. This can be done using information provided from the host computer 110 (FIG. 2), which as described above, typically defines each of the files within the file system based upon the file system blocks assigned to them. Again referring to the example of FIG. 4, assume that the file system 1000 (FIG. 3) includes three files, with file A being stored at file system blocks (0–24 and 77–92), with file B being stored at file system blocks (25–28, 44–76 and 93–99), and with file C being stored at file system blocks (29–43). As seen from FIG. 4, using the information from host computer 110 that specifies the file system blocks allocated to each file, the mapping shown in FIG. 4 can be completed to correlate each of the files in the file system with the physical storage locations wherein the data is stored.

The information from the host computer 10 that lists the file system blocks assigned to each file can be obtained in any of numerous ways, as the present invention is not limited to any particular information gathering technique. For example, the SYMMETRIX line of storage systems employ an application programming interface (API) that can be employed to request this information from the host computer 110.

In the illustrative example discussed above, the mapping between a repository of logical objects and physical space is discussed in connection with a file system. However, it should be appreciated that the present invention is not limited in this respect, and that the above-described mapping technique can be employed for other types of repositories of logical objects.

It should be appreciated from the foregoing that once the mapping information shown in FIG. 4 has been developed, it can be employed to perform an incremental virus scan. For example, when the host computer 110 desires to perform a virus scan for a file system, the host computer first queries the storage system to provide a list of the files within the file system that have changed and should be scanned. The storage system can perform a routine such as that shown in FIG. 5 to return such a list. Once the list is returned, the host computer 110 can perform a virus scan only on the list of files identified by the routine as having been changed, which as discussed above, can provide a significant performance improvement as compared to scanning the entire file system.

FIG. 5 is an illustrative routine that can be performed to check which files in a repository of logical objects (e.g., a file system) have been changed subsequent to a particular reference time. Initially, in step 1050, the routine performs a mapping between the file system and the physical storage space to identify which physical storage tracks store data belonging to the file system. This can be done in the manner discussed above in connection with FIG. 4. Next, in step 1052, the routine identifies which of the tracks that store data in the file system have data that has changed since the reference time (e.g., the last time a virus scan has been performed). As discussed above, this can be done in any of numerous ways. For example, in a storage system from the SYMMETRIX line of storage systems, a bitmap is provided for each logical volume that identifies which tracks have changed since the reference time, and numerous different bitmaps can be employed with different reference times. Thus, such a bitmap can be employed with the reference time being correlated to the last time a virus scan was performed, and the bitmaps can be checked for change information for the relevant tracks identified in step 1050. Finally, in step 1054, the routine returns to the host computer 110 a list of the files within the file system that correspond to tracks having data that has changed since the reference time (e.g., the last virus scan). Again, this can be performed using the mapping information in FIG. 4.

The illustrative routine shown in FIG. 5 performs a forward mapping of the file system to identify the physical storage locations wherein the file system is stored, uses the change information at the physical level to identify physical storage locations that have changed, and then performs a reverse mapping from that change information to the file system space to identify the particular files that have changed. In accordance with one embodiment of the present invention, a routine such as that shown in FIG. 5 can be executed each time it is desired to determine the list of files that have changed subsequent to a reference time (e.g., each time a virus scan is run on a particular file system). Alternatively, in another embodiment of the present invention, the functions performed by the routine of FIG. 5 can be performed at different times, such that the mapping of the repository of logical objects (e.g., the file system) to physical space to create a collection of mapping information such as that shown in FIG. 4 can be performed once for a particular file system, and then the mapping information created can be referred to during later executions of a routine that seeks to identify which files have changed subsequent to a reference time. This embodiment of the present invention is shown in FIGS. 6A–6B.

Figure 6A:
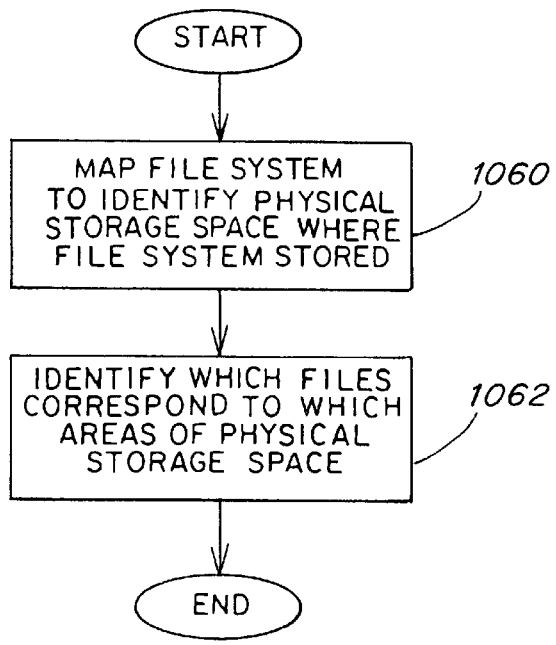
FIG. 6A is a flow chart of a routine for mapping a file system to physical storage space and identifying which files corresponds to which areas of physical storage space in accordance with one illustrative embodiment of the invention.

FIG. 6A shows a routine that can be executed once for a repository of logical objects (e.g., a file system) to create a set of mapping information similar to that shown in FIG. 4, which can be referenced during subsequent iterations of routines seeking to determine accesses to particular logical objects (e.g., particular files) within the repository. In this respect, while several of the embodiments of the present invention discussed herein relate to the use of change information at the physical level to identify particular logical objects within a repository that have changed subsequent to a particular reference time, it should be appreciated that the present invention is not limited in this respect, and that the mapping techniques used herein can be used in conjunction with any type of information relating to physical space, such as information relating to all accesses (e.g., reads and writes) to particular physical storage locations.

Referring to the routine of FIG. 6A, in step 1060, the routine performs the mapping between the file system and the physical storage space to identify which physical storage tracks store data belonging to the file system. This can be done in the manner discussed above in connection with FIG. 4, in a manner similar to that of step 1050 of the routine of FIG. 5. Next, in step 1062, the routine identifies which files correspond to which areas of physical storage space. This can be done in the manner discussed above in connection with FIG. 4, for example, by employing information provided from the host computer 110 (FIG. 2), which as discussed above, typically defines each of the files within the file system based upon the file system blocks assigned to them. Thus, after the performance of step 1062, mapping information similar to that shown in FIG. 4 can be provided which identifies the physical storage location for each of the files in the file system. In the illustrative example shown in FIG. 4, the information is provided at the physical storage level on a track boundary for reasons discussed above. However, as discussed above, the present invention is not limited in this respect, as the mapping information of FIG. 4 can be provided on different physical boundaries.

Figure 6B:
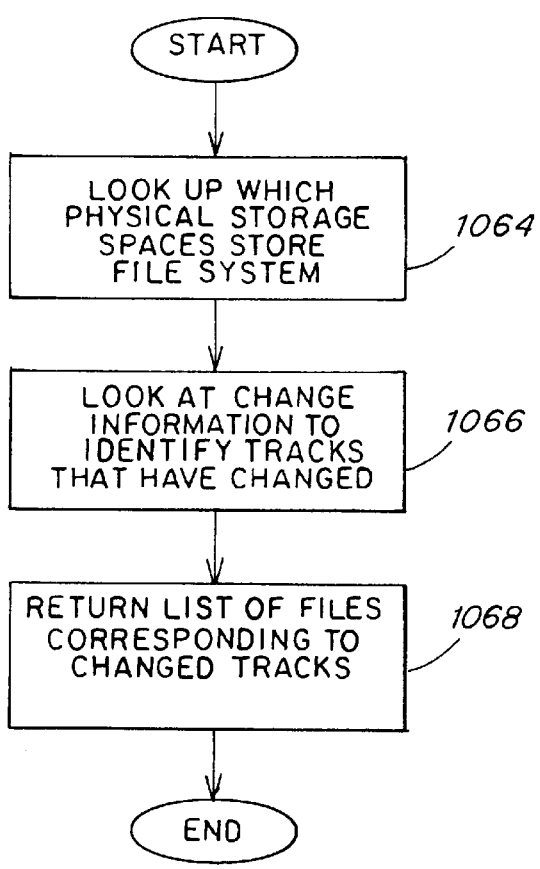
FIG. 6B is a flow chart of a routine for using information created by the routine of FIG. 6A to determine a list of files within the file system that have data that has changed subsequent to a reference time in accordance with one illustrative embodiment of the invention.

FIG. 6B illustrates a routine that can be executed subsequent to the routine of FIG. 6A, and that employs the mapping information (see e.g., FIG. 4) created thereby to return a list of logical objects (e.g., files) within a repository of logical objects (e.g., a file system) that have changed subsequent to a reference time. Initially, in step 1064, the routine refers to the mapping information created by the routine of FIG. 6A to identify which physical storage locations store the file system. In this respect, step 1064 differs from step 1050 of the routine of FIG. 5 in that step 1064 does not actually perform a mapping of the file system to physical storage space, but rather relies upon mapping information already created by the routine of FIG. 6A. Next, at step 1066, the routine looks at the change information in physical space to identify tracks that have changed, in much the same manner as step 1052 in the routine of FIG. 5. Finally, in step 1068, the routine returns a list of files corresponding to the changed tracks, in much the same manner as step 1054 in the routine of FIG. 5.

As should be appreciated from the foregoing, the primary difference between the routine of FIG. 5 and the routines of FIGS. 6A–6B is that the routine of FIG. 5 performs a mapping from the logical to the physical level and returns a list of changed files during a single execution. Alternatively, the routines of FIGS. 6A–6B divide the functions of building the mapping information (e.g., FIG. 4) and employing that mapping information to identify files that have changed since a particular reference time. These alternative embodiments of the present invention each provides advantages in certain instances. For example, for relatively small repositories of logical objects (e.g, small file systems), it may be simpler to execute a routine such as that of FIG. 5, as the mapping between the repository and the physical storage space may not take an excessively long time. Alternatively, for relatively large repositories of logical objects, the mapping between the repository and physical storage space can take a significant amount of time, such that it may not be efficient to perform this mapping each time change information is desired. For example, if a virus scan was to be run on a relatively large file system, it may be more efficient to execute the routine of FIG. 6A to perform the mapping at a point in time when it is convenient (e.g., when the file system is initialized), so that the routine of FIG. 6B will execute more quickly when the virus scan is performed, as the mapping information has already been created. In addition, if multiple routines are executed that refer to the mapping information created by the routine of FIG. 6A, it can be more efficient to perform this mapping only once, rather than each time a routine is executed that accesses this information.

It should be appreciated that in the embodiment of the present invention shown in FIGS. 6A–6B, the routine of FIG. 6B is executed subsequent to the creation of the mapping information (see e.g., FIG. 4) by the routine of FIG. 6A. As a result, in one embodiment of the present invention, steps are taken to ensure that the mapping information is still accurate when the routine of FIG. 6B is executed. This can be done in any of numerous ways, as the present invention is not limited to any particular implementation technique. For example, it should be appreciated that when physical storage space is allocated to a file system or other repository of logical objects, there may be some allocated physical storage blocks that are unassigned to any particular file, and are available to accommodate new files or files that grow to extend beyond the physical blocks previously assigned. Thus, in one embodiment of the present invention, a technique for determining that the mapping information is out of date checks to see whether change information corresponds to a file system block that is not assigned to a file name in the mapping information (e.g., FIG. 4). When that situation is detected, it indicates that the mapping information is out of date, such that it must be regenerated, for example, by reexecuting the routine of FIG. 6A.

In the illustrative examples described above for performing the mapping from the file system to the physical space 330, only a single mapping layer is present, i.e., the mapping layer for the file system itself. However, as discussed above in connection with FIG. 2, some computer systems include an additional mapping layer, such as an LVM 324, that is disposed between the file system 322 and the physical space 330. While this adds an additional mapping layer to be accounted for when mapping from the file system to physical space 330, the same principles described above in connection with FIGS. 3–6 can be employed. For example, the LVM can be considered as having a set of contiguous LVM blocks of storage allocated to store the logical volumes managed by the LVM. The file system storage blocks can be overlaid onto the LVM storage blocks in much the same manner as discussed above in connection with FIGS. 3–4, and then the LVM storage blocks can in turn be overlaid onto the physical storage blocks in much the same manner. Then, information from the host computer 110 can be gathered that defines which files are assigned to particular file system blocks, and analogous information can be gathered from the LVM concerning which logical volumes are stored in which LVM storage blocks. Using such information, the physical storage location for each file can be obtained in much the same manner as discussed above in connection with FIGS. 3–6.

Some host based mapping layers perform a striping of data across the logical volumes presented from the storage system, such that contiguous blocks in the mapping space (e.g., an LVM) can be striped across two or more logical volumes. Such mapping layers simply require additional recordkeeping in overlaying the logical space onto the physical space, which can be handled in much the same manner as discussed above.

While the embodiments of the present invention relating to identifying accesses to a logical object based upon changes to the data stored at the physical level have been discussed above in connection with improving the performance of a file system virus scan, this aspect of the present invention has numerous other applications. For example, another application in which this aspect of the present invention can be used is to perform an incremental file check. File checks often are performed on a repository of logical objects (e.g., a file system or database) to determine whether the data included therein is corrupt, with the file check being a low level format check. The conventional way of performing a file check is to check the entire file system, with the host computer system being off-line, which can take a significant amount of time. Like the virus check, Applicants have recognized that it is not always necessary to perform a file check on the entire file system, but rather, an incremental file check can be performed only on portions of the file system that have been written to subsequent to a previously performed file check, as data which has not been overwritten cannot have become corrupted. Thus, using the aspects of the present invention discussed above, mapping can be performed to identify only the portions of a file system that actually have been changed, such that the host computer 110 can perform a file check only on the necessary portions of the file system, thereby saving valuable time and computational resources.

Many file check routines do not perform a check on a file basis, but rather, actually require the identification of particular file system blocks of data to be checked. When used in connection with such a file check routine, the mapping techniques discussed above in connection with FIGS. 3–6 can be modified to identify particular file system blocks that have been changed. For example, when used in connection with a storage system that provides change information on a track level as discussed above, for each track identified (e.g., at step 1052 in FIG. 5 and steps 1066 in FIG. 6B) as having data that was changed subsequent to the reference time, the routine can return a list of all of the file system blocks stored on that track. It should be appreciated that such information may be overly conservative, as only a subset of the file system blocks stored on a particular track may actually have changed. However, this is not a limitation of the present invention, but rather, it is a function of the level of granularity at which the storage system stores change information. If used in connection with a storage system that provides change information at a different level of granularity, the embodiments of the present invention described above can correspondingly provide different levels of granularity to the check routine with respect to which file system blocks have changed.

In each of the applications discussed above, the embodiment of the present invention relating to identifying accesses to a logical object based upon accesses to data at the physical level has been used to monitor data that has been changed subsequent to a particular reference time. However, the invention is not so limited, as this embodiment of the present invention can be employed with applications relating to other types of data access. For example, another application for the above-discussed embodiments of the present invention relates to determining logical objects (e.g., files) that are accessed frequently within a storage system. The knowledge that a particular file is being accessed frequently can then be used by the host in any of numerous ways particular to the host application. For example, the host can duplicate or mirror the file, or can move it to another location.

It should be appreciated that many intelligent storage systems have a facility for identifying frequently accessed units of data (e.g., tracks) in physical space 330 (FIG. 1), and have the ability to share this information with the host computer 110. However, in conventional computer systems, the host has no ability to determine what logical data is stored at a particular physical storage location that is accessed frequently. Thus, the host computer is unable to make intelligent decisions about what, if any, action should be taken in response to a particular physical storage location being accessed frequently. Conversely, using the above-described mapping techniques according to one embodiment of the present invention, the host computer can be provided with a list of logical objects (e.g., files) that are accessed frequently. This provides a significantly more powerful tool to the host computer, which can make informed decisions about what, if any, action to take.

It should be appreciated that a routine for determining which logical objects are being accessed frequently can be implemented in any of numerous ways. For example, such a routine can be initiated by a request from the host computer for an identification of what logical objects (e.g., files in a file system) are being accessed frequently. Alternatively, a routine can be configured to automatically provide notification to the host computer when access to any logical object exceeds a specified threshold.

It should be appreciated that some existing host computer systems already have the capability of monitoring access to certain files. However, to do so, the host computer must execute a program to monitor its file system directories to see what files are being accessed frequently. This is disadvantageous as it takes away processing power from the main functions of the host computer. Conversely, the aspect of the present invention relating to identifying logical objects that are accessed frequently can be implemented elsewhere, so as to not degrade performance of the host computer. In addition, since there typically is hardware support in the storage system to identify areas in the physical space 330 (FIG. 1) that are accessed frequently, the use of this facility can provide a significantly more efficient technique for determining which logical objects are accessed frequently.

One environment particularly well suited for the aspect of the present invention relating to identifying logical objects (e.g., files) that are accessed frequently relates to storage systems that store the content for servers over a distributed network, such as the Internet. Many Internet sites include multiple servers that are geographically dispersed, although each does not necessarily control access to the same content stored on an associated storage system. Providing such a server with information regarding which logical objects (e.g., files) are accessed most frequently can enable the server to take a number of actions to improve system performance. For example, a web server has the capability of determining the geographic origin of requests for access to the server. By informing the server that certain files are accessed frequently, the server can investigate the geographic origin of the access requests, and if it is determined that they are concentrated in a particular geographic area, the targeted logical object or file can be moved to a storage system and server that are geographically closer to the source of the frequent requests.

It should be appreciated that the aspect of the present invention relating to identifying data accesses to a network server provides significantly greater flexibility than has been available in conventional systems. For example, while conventional systems have enabled data to be moved about in a distributed network, this typically is done on a static basis, such that an entire grouping of data in physical space 330 (e.g., one or more logical volumes) can be moved, most typically to balance the load on the servers in the network. Such a move is performed without an appreciation for the content of the information; in other words, without an appreciation for how the data is logically related.

Alternatively, when logical units of data are to be moved in conventional systems, entire repositories of logical objects typically are moved about the distributed network. For example, an entire file system might be moved from one storage system and server to another. The embodiment of the present invention described above provides significantly greater flexibility, and enables the movement of only a subset of a repository of logical objects, such as only certain targeted files within a file system. Also, since a smaller amount of data is being moved, this can be done dynamically, rather than taking down the system for reconfiguration.

As an example, consider a distributed system of servers and corresponding storage systems that provide access to a library of movies over the Internet. If such a library includes a large number of movies, the file system will be extremely large. Assume that access is frequently made to a particular movie, and is targeted from a certain geographic area. With the above-described embodiment of the present invention, the server can be provided with information that a particular movie is being accessed frequently. Thereafter, the server can determine the origin of the requests, and potentially can relocate the file that includes the targeted movie to another storage system and server that is located more conveniently to the origin of the frequent requests. Such a move can be done dynamically, and is significantly different in kind than the type of movements that might have been done in the past, which were limited to moving the entire file system. In this respect, since conventional systems do not have the capability of determining access to any particular file within a file system without incurring significant performance penalties for the server, conventional systems were not able to make the type of intelligent decisions that can be made employing the aspects of the present invention discussed above.

It should be appreciated that data can be moved in a distributed network in any of numerous ways, as the present invention is not limited to any particular data movement technique. For example, when the storage systems are implemented from the SYMMETRIX line of data storage systems, an automatic facility for direct communication of data from one storage system to the other (e.g., using SYMMETRIX Remote Data Facility) can be employed. However, it should be appreciated that the present invention is not limited in this respect, and that any other data movement technique can be employed.

It should be appreciated from the foregoing that one embodiment of the present invention relates to a copying and/or mirroring only a subset of a repository of logical objects (e.g., a file system or database) to another location. It is believed that in the prior art, portions of a file system or database would not be copied or mirrored to another location.

In the description provided above, several specific examples are provided of applications that can employ the aspect of the present invention relating to identifying accesses to a repository of logical objects based upon access to data stored at the physical level. However, it should be appreciated that these examples are not meant to be exhaustive, as numerous other applications for this aspect of the present invention can be employed.

The above-discussed embodiments of the present invention can be implemented in any of numerous ways. For example, the above-discussed routines for mapping logical objects to physical space can be implemented in hardware, software, or a combination thereof, either included within the storage system, the host computer, or some other device in the system, or distributed throughout the system. When implemented in software, the routines can be executed on any suitable processor, such as a processor within the storage system, the host computer, a dedicated server or any other processor to provide auxiliary processing power to the storage system or the host computer.

It should be appreciated that any single component or collection of multiple components of the computer system that perform the functions described above can be generically considered as one or more controllers that control the above-discussed functions. The one or more controllers can be implemented in numerous ways, such as with dedicated hardware, or using a processor that is programmed using microcode or software to perform the functions recited above. In this respect, it should be appreciated that one implementation of the present invention comprises at least one computer readable medium (e.g., a computer memory, a floppy disc, a compact disc, a tape, etc.) encoded with a computer program that, when executed on a processor, performs the above-discussed functions of the present invention. The computer readable medium can be transportable such that the program stored thereon can be loaded onto any computer system resource to implement the aspects of the present invention discussed above. In addition, it should be appreciated that the reference to a computer program that, when executed, performs the above-discussed functions is not limited to an application program running in application space on the host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A method for use in a computer system, the computer system including a host computer having an application space and defining a repository of logical objects visible to the application space, the computer system further including a storage system that a defines a physical space wherein data representing the repository of logical objects is stored, the repository of logical objects including a plurality of logical objects, the method comprising acts of:

(A) mapping the repository of logical objects from the application space to the physical space to create mapping information identifying which units of storage in the physical space store the repository of logical objects; and (B) making the mapping information visible to the application space.

2. The method of claim 1, wherein the act (A) includes an act of creating mapping information identifying which units of storage in the physical space store each of the plurality of logical objects in the repository of logical objects.

3. The method of claim 2, wherein the repository of logical objects is organized in logical blocks, wherein the physical space is organized in physical blocks, and wherein the act (A) includes acts of:

overlying the repository of logical objects over a portion of the physical space allocated thereto to identify which of the physical blocks correspond to each of the logical blocks; and identifying, for each one of the plurality of logical objects, which physical blocks store the data forming the one of the plurality of logical objects by determining which of the logical blocks correspond to the one of the plurality of logical objects.

4. The method of claim 1, wherein the repository of logical objects is a file system including a plurality of files, and wherein the act (A) includes an act of creating mapping information identifying which units of storage in the physical space store each of the plurality of files in the file system.

5. The method of claim 1, wherein the storage system includes access information identifying accesses to the units of storage in physical space, and wherein the method further includes an act of:

(C) identifying accesses to the repository of logical objects based upon the access information identifying accesses to the corresponding units of storage in physical space that store the repository of logical objects.

6. The method of claim 5, wherein the access information identifies units of storage in physical space that have changed subsequent to a reference time, and wherein the act (C) includes an act of identifying which of the plurality of logical objects in the repository have changed subsequent to the reference time based upon the access information identifying which of the corresponding units of storage in physical space that store the repository of logical objects have changed subsequent to the reference time.

7. The method of claim 6, further including acts of:
(D) prior to the act (C), executing an operation on the repository of logical objects, the execution of the operation establishing the reference time; and
(E) subsequent to the act (C), executing an incremental operation on the repository of logical objects, such that the incremental operation is performed only on those of the plurality of logical objects identified in the act (C) as having changed subsequent to the execution of the operation in the act (D).

8. The method of claim 7, wherein the repository of logical objects is a file system;
wherein the act (D) includes an act of executing an operation that performs a virus scan on the file system; and
wherein the act (E) includes an act of executing an operation that performs an incremental virus scan on the file system.

9. The method of claim 7, wherein the repository of logical objects is a file system;
wherein the act (D) includes an act of executing an operation that performs a file check on the file system; and
wherein the act (E) includes an act of executing an operation that performs an incremental file check on the file system.

10. The method of claim 5, wherein the access information identifies how frequently units of storage in physical space are accessed, and wherein the act (C) includes an act of identifying how frequently at least some of the plurality of logical objects in the repository are accessed based upon the access information identifying how frequently the corresponding units of storage in physical space that store the repository of logical objects are accessed.

11. The method of claim 10, wherein the act (C) includes an act of identifying which of the plurality of logical objects in the repository are accessed more frequently than a specified threshold based upon the access information identifying which of the corresponding units of storage in physical space that store the repository of logical objects are accessed more frequently than the specified threshold.

12. The method of claim 11, wherein the act (C) is performed automatically within the storage system, and includes an act of identifying to the host computer which of the plurality of logical objects in the repository are accessed more frequently than the specified threshold.

13. The method of claim 11, wherein the act (C) is performed in response to a request from the host computer.

14. The method of claim 11, further including an act of:
(D) copying a subset of the plurality of logical objects in the repository to an additional physical storage location based upon the identification in the act (C) of how frequently the at least some of the plurality of objects are accessed.

15. The method of claim 10, wherein the storage system is a first storage system and wherein the computer system further includes a second storage system, and wherein the method further includes an act of:
(D) relocating a subset of the plurality of logical objects in the repository to the second storage system based upon the identification in the act (C) of how frequently the at least some of the plurality of objects are accessed.

16. The method of claim 15, wherein the act (D) is performed dynamically.

17. The method of claim 1, further including an act of (C) storing the mapping information in the computer system.

18. The method of claim 17, wherein the acts (A)–(C) are performed in response to execution of a first iteration of at least one application program executing in the application space on the host computer, and wherein the method further includes an act of referring to the mapping information during a second iteration of the at least one application program executing in the application space on the host computer.

19. The method of claim 1, wherein the repository of logical objects stores the plurality of logical objects in logical blocks having a logical block size, wherein data is stored in the physical space in physical blocks having a physical block size, and wherein the act (A) includes acts of:
converting at least one of the repository of logical objects and the physical space to a different block size; and
overlaying the repository of logical objects over a portion of the physical space allocated thereto.

20. The method of claim 1, wherein the act (B) includes an act of making the mapping information visible to at least one application program executing in the application space.

21. A computer readable medium encoded with a program for execution on a computer system including a host computer and a storage system, the host computer having an application space and defining a repository of logical objects visible to the application space, the storage system defining a physical space wherein data representing the repository of logical objects is stored, the repository of logical objects including a plurality of logical objects, the program, when executed on the computer system, performing a method comprising acts of:
(A) mapping the repository of logical objects from the application space to the physical space to create mapping information identifying which units of storage in the physical space store the repository of logical objects; and
(B) making the mapping information visible to the application space.

22. The computer readable medium of claim 21, wherein the act (A) includes an act of creating mapping information identifying which units of storage in the physical space store each of the plurality of logical objects in the repository of logical objects.

23. The computer readable medium of claim 22, wherein the repository of logical objects is organized in logical blocks, wherein the physical space is organized in physical blocks, and wherein the act (A) includes acts of:
overlaying the repository of logical objects over a portion of the physical space allocated thereto to identify which of the physical blocks correspond to each of the logical blocks; and
identifying, for each one of the plurality of logical objects, which physical blocks store the data forming the one of the plurality of logical objects by determining which of the logical blocks correspond to the one of the plurality of logical objects.

24. The computer readable medium of claim 21, wherein the repository of logical objects is a file system including a plurality of files, and wherein the act (A) includes an act of creating mapping information identifying which units of storage in the physical space store each of the plurality of files in the file system.

25. The computer readable medium of claim 21, wherein the storage system includes access information identifying accesses to the units of storage in physical space, and wherein the method further includes an act of:

(C) identifying accesses to the repository of logical objects based upon the access information identifying accesses to the corresponding units of storage in physical space that store the repository of logical objects.

26. The computer readable medium of claim 25, wherein the access information identifies units of storage in physical space that have changed subsequent to a reference time, and wherein the act (C) includes an act of identifying which of the plurality of logical objects in the repository have changed subsequent to the reference time based upon the access information identifying which of the corresponding units of storage in physical space that store the repository of logical objects have changed subsequent to the reference time.

27. The computer readable medium of claim 26, wherein the method further includes acts of:

(D) prior to the act (C), executing an operation on the repository of logical objects, the execution of the operation establishing the reference time; and (E) subsequent to the act (C), executing an incremental operation on the repository of logical objects, such that the incremental operation is performed only on those of the plurality of logical objects identified in the act (C) as having changed subsequent to the execution of the operation in the act (D).

28. The computer readable medium of claim 27, wherein the repository of logical objects is a file system;

wherein the act (D) includes an act of executing an operation that performs a virus scan on the file system; and wherein the act (E) includes an act of executing an operation that performs an incremental virus scan on the file system.

29. The computer readable medium of claim 27, wherein the repository of logical objects is a file system;

wherein the act (D) includes an act of executing an operation that performs a file check on the file system; and wherein the act (E) includes an act of executing an operation that performs an incremental file check on the file system.

30. The computer readable medium of claim 25, wherein the access information identifies how frequently units of storage in physical space are accessed, and wherein the act (C) includes an act of identifying how frequently at least some of the plurality of logical objects in the repository are accessed based upon the access information identifying how frequently the corresponding units of storage in physical space that store the repository of logical objects are accessed.

31. The computer readable medium of claim 30, wherein the act (C) includes an act of identifying which of the plurality of logical objects in the repository are accessed more frequently than a specified threshold based upon the access information identifying which of the corresponding units of storage in physical space that store the repository of logical objects are accessed more frequently than the specified threshold.

32. The computer readable medium of claim 31, wherein the act (C) is performed automatically within the storage system, and includes an act of identifying to the host computer which of the plurality of logical objects in the repository are accessed more frequently than the specified threshold.

33. The computer readable medium of claim 31, wherein the act (C) is performed in response to a request from the host computer.

34. The computer readable medium of claim 31, wherein the method further includes an act of:

(D) copying a subset of the plurality of logical objects in the repository to an additional physical storage location based upon the identification in the act (C) of how frequently the at least some of the plurality of objects are accessed.

35. The computer readable medium of claim 30, wherein the storage system is a first storage system and wherein the computer system further includes a second storage system, and wherein the method further includes an act of:

(D) relocating a subset of the plurality of logical objects in the repository to the second storage system based upon the identification in the act (C) of how frequently the at least some of the plurality of objects are accessed.

36. The computer readable medium of claim 35, wherein the act (D) is performed dynamically.

37. The computer readable medium of claim 21, wherein the method further includes an act of (C) storing the mapping information in the computer system.

38. The computer readable medium of claim 37, wherein the acts (A)–(C) are performed in response to execution of a first iteration of at least one application program executing in the application space on the host computer, and wherein the method further includes an act of referring to the mapping information during a second iteration of the at least one application program executing in the application space on the host computer.

39. The computer readable medium of claim 21, wherein the repository of logical objects stores the plurality of logical objects in logical blocks having a logical block size, wherein data is stored in the physical space in physical blocks having a physical block size, and wherein the act (A) includes acts of:

converting at least one of the repository of logical objects and the physical space to a different block size; and overlaying the repository of logical objects over a portion of the physical space allocated thereto.

40. The computer readable medium of claim 21, wherein the act (B) includes an act of making the mapping information visible to at least one application program executing in the application space.

41. A method for use in a computer system, the computer system including a host computer and a storage system, the host computer having an application space and defining a repository of logical objects visible to the application space, the repository of logical objects including a plurality of logical objects, the method comprising acts of:

(A) executing an operation on the repository of logical objects; and (B) subsequent to the act (A), executing an incremental operation on the repository of logical objects, such that the incremental operation is performed only on those of the plurality of logical objects that have changed subsequent to the execution of the operation in the act (A).

42. The method of claim 41, wherein the repository of logical objects is a file system;

wherein the act (A) includes an act of executing an operation that performs a virus scan on the file system; and wherein the act (B) includes an act of executing an operation that performs an incremental virus scan on the file system.

43. The method of claim 41, wherein the repository of logical objects is a file system;
wherein the act (A) includes an act of executing an operation that performs a file check on the file system; and
wherein the act (B) includes an act of executing an operation that performs an incremental file check on the file system.

44. The method of claim 41, wherein the act (A) includes an act of performing the operation exclusively on the repository of logical objects.

45. A computer readable medium encoded with a program for execution on a computer systems including a host computer and a storage system, the host computer having an application space and defining a repository of logical objects visible to the application space, the repository of logical objects including a plurality of logical objects, the program, when executed on the computer system, performing a method comprising acts of:
(A) executing an operation on the repository of logical objects; and
(B) subsequent to the act (A), executing an incremental operation on the repository of logical objects, such that the incremental operation is performed only on those of the plurality of logical objects that have changed subsequent to the execution of the operation in the act (A).

46. The computer readable medium claim 45, wherein the repository of logical objects is a file system;
wherein the act (A) includes an act of executing an operation that performs a virus scan on the file system; and
wherein the act (B) includes an act of executing an operation that performs an incremental virus scan on the file system.

47. The computer readable medium of claim 45, wherein the repository of logical objects is a file system;
wherein the act (A) includes an act of executing an operation that performs a file check on the file system; and
wherein the act (B) includes an act of executing an operation that performs an incremental file check on the file system.

48. The computer readable medium of claim 45, wherein the act (A) includes an act of performing the operation exclusively on the repository of logical objects.

49. An apparatus for use in a computer system including a host computer and a storage system, the host computer having an application space and defining a repository of logical objects visible to the application space, the storage system defining a physical space wherein data representing the repository of logical objects is stored, the repository of logical objects including a plurality of logical objects, the apparatus comprising:
at least one controller, coupled to the host computer and the storage system, that maps the repository of logical objects from the application space to the physical space to create mapping information identifying which units of storage in the physical space store the repository of logical objects, the at least one controller making the mapping information visible to the application space on the host computer.

50. The apparatus of claim 49, wherein the at least one controller includes at least one memory and at least one processor that is programmed, by a program stored in the at least one memory, to create the mapping information.

51. The apparatus of claim 50, wherein the at least one processor is programmed to create mapping information identifying which units of storage in the physical space store each of the plurality of logical objects in the repository of logical objects.

52. The apparatus of claim 51, wherein the repository of logical objects is organized in logical blocks, wherein the physical space is organized in physical blocks, and wherein the at least one processor is programmed to:
overlay the repository of logical objects over a portion of the physical space allocated thereto to identify which of the physical blocks correspond to each of the logical blocks; and
identify, for each one of the plurality of logical objects, which physical blocks store the data forming the one of the plurality of logical objects by determining which of the logical blocks correspond to the one of the plurality of logical objects.

53. The apparatus of claim 50, wherein the repository of logical objects is a file system including a plurality of files, and wherein the at least one processor is programmed to create mapping information identifying which units of storage in the physical space store each of the plurality of files in the file system.

54. The apparatus of claim 50, wherein the storage system includes access information identifying accesses to the units of storage in physical space, and wherein the at least one processor is programmed to identify accesses to the repository of logical objects based upon the access information identifying accesses to the corresponding units of storage in physical space that store the repository of logical objects.

55. The apparatus of claim 54, wherein the access information identifies units of storage in physical space that have changed subsequent to a reference time, and wherein the at least one processor is programmed to identify which of the plurality of logical objects in the repository have changed subsequent to the reference time based upon the access information identifying which of the corresponding units of storage in physical space that store the repository of logical objects have changed subsequent to the reference time.

56. The apparatus of claim 54, wherein the access information identifies how frequently units of storage in physical space are accessed, and wherein the at least one processor is programmed to identify how frequently at least some of the plurality of logical objects in the repository are accessed based upon the access information identifying how frequently the corresponding units of storage in physical space that store the repository of logical objects are accessed.

57. The apparatus of claim 56, wherein the at least one processor is programmed to identify which of the plurality of logical objects in the repository are accessed more frequently than a specified threshold based upon the access information identifying which of the corresponding units of storage in physical space that store the repository of logical objects are accessed more frequently than the specified threshold.

58. The apparatus of claim 57, wherein the at least one processor is programmed to automatically identify to the host computer which of the plurality of logical objects in the repository are accessed more frequently than the specified threshold.

59. The apparatus of claim 57, wherein the at least one processor is programmed to identify to the host computer which of the plurality of logical objects in the repository are accessed more frequently than the specified threshold in response to a request from the host computer.

60. The apparatus of claim 56, wherein the storage system is a first storage system and wherein the computer system further includes a second storage system, and wherein the at least one processor is programmed to relocate a subset of the plurality of logical objects in the repository to the second storage system based upon the identification of how frequently the at least some of the plurality of objects are accessed.

61. The apparatus of claim 60, wherein the at least one processor is programmed to relocate the subset of the plurality of logical objects dynamically.

62. The apparatus of claim 56, wherein the at least one processor is programmed to copy a subset of the plurality of logical objects in the repository to an additional physical storage location based upon the identification of how frequently the at least some of the plurality of objects are accessed.

63. The apparatus of claim 50, wherein the at least one processor is programmed to store the mapping information in the computer system.

64. The apparatus of claim 50, in combination with the storage system, wherein the apparatus is disposed within the storage system.

65. The apparatus of claim 50, in combination with the host computer, wherein the apparatus is disposed within the host computer.

66. The apparatus of claim 49, wherein the at least one controller includes:
means for mapping the repository of logical objects from the application space to the physical space to create mapping information identifying which units of storage in the physical space store the repository of logical objects; and
means for making the mapping information visible to the application space on the host computer.

67. A storage system for use in a computer system including the storage system and a host computer, the host computer having an application space and defining a repository of logical objects visible to the application space, the repository of logical objects including a plurality of logical objects, the storage system comprising:
at least one storage device that defines a physical space wherein data representing the repository of logical objects is stored, the at least one storage device further storing access information identifying accesses to units of storage in the physical space; and
at least one controller that identifies to the host computer accesses to the repository of logical objects based upon the access information identifying accesses to the corresponding units of storage in physical space that store the repository of logical objects.

68. The storage system of claim 67, wherein the access information identifies units of storage in physical space that have changed subsequent to a reference time, and wherein the controller identifies which of the plurality of logical objects in the repository have changed subsequent to the reference time based upon the access information.

69. The storage system of claim 67, wherein the access information identifies how frequently units of storage in the physical space are accessed, and wherein the at least one controller identifies how frequently at least some of the plurality of logical objects in the repository are accessed based upon the access information.

70. The storage system of claim 69, wherein the at least one controller identifies which of the plurality of logical objects in the repository are accessed more frequently than a specified threshold based upon the access information identifying which of the corresponding units of storage in physical space that store the repository of logical objects are accessed more frequently than the specified threshold.

71. The storage system of claim 70, wherein the at least one controller copies a subset of the plurality of logical objects in the repository to an additional storage location in response to the identification of the subset of the plurality of logical objects as being accessed more frequently than the specified threshold.

72. The storage system of claim 71, wherein the at least one controller copies the subset of the plurality of the logical volumes dynamically.

73. The storage system of claim 70, the at least one controller automatically identifies to the host computer which of the plurality of logical objects are accessed more frequently than the specified threshold.

74. The storage system of claim 70, wherein the at least one controller identifies which of the plurality of logical objects are accessed more frequently than the specified threshold in response to a request from the host computer.

75. The storage system of claim 67, wherein the at least one controller maps the repository of logical objects from the application space to the physical space to create mapping information identifying which units of storage in the physical space store each of the plurality of logical objects in the repository of logical objects.

76. The storage system of claim 75, wherein the repository of logical objects is a file system including a plurality of files, and wherein the at least one controller creates mapping information identifying which units of storage in the physical space store each of the plurality of files in the file system.

77. A method for use in a computer system, the computer system including a host computer having an application space and defining a repository of logical objects visible to the application space, the repository of logical objects including a plurality of logical objects, the computer system further including a first storage system and a second storage system each coupled to the host computer via a network, the repository of logical objects being stored on the first storage system, the method comprising acts of:
(A) determining that a subset of the plurality of logical objects in the repository satisfy a particular selection criterion; and
(B) transferring the subset of the plurality of logical objects, but not the entire repository of logical objects, over the network from the first storage system to the second storage.

78. The method of claim 77, wherein the act (B) includes an act of moving the subset of the plurality of logical objects from the first storage system to the second storage system.

79. The method of claim 77, wherein the act (B) includes an act of copying the subset of the plurality of logical objects from the first storage system to the second storage system.

80. The method of claim 77, wherein the selection criterion relates to how frequently the subset of the plurality of logical objects is accessed.

* * * * *